United States Patent
Wu et al.

(10) Patent No.: US 10,314,134 B1
(45) Date of Patent: Jun. 4, 2019

(54) RETROFIT LED LAMP (71) Applicant: SIGNIFY HOLDING B.V., Eindhoven (NL)

(72) Inventors: Xiujuan Wu, Eindhoven (NL); Han Lu, Eindhoven (NL); Jing Xu Zhou, Eindhoven (NL); Jason J Yang, Eindhoven (NL); Jessie Wang, Eindhoven (NL); Tian Ella, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/135,514

(22) Filed: Sep. 19, 2018

(30) Foreign Application Priority Data

Jun. 26, 2018 (EP) ..................................... 18179696

(51) Int. Cl.
*H05B 33/08* (2006.01)
*F21K 9/27* (2016.01)
*F21V 23/02* (2006.01)
*F21Y 103/10* (2016.01)
*F21Y 115/10* (2016.01)

(52) U.S. Cl.
CPC ........... *H05B 33/0884* (2013.01); *F21K 9/27* (2016.08); *F21V 23/02* (2013.01); *H05B 33/083* (2013.01); *H05B 33/0809* (2013.01); *H05B 33/0827* (2013.01); *F21Y 2103/10* (2016.08); *F21Y 2115/10* (2016.08)

(58) Field of Classification Search
CPC combination set(s) only.
See application file for complete search history.

(56) References Cited

U.S. PATENT DOCUMENTS

| 7,936,135 B2 * | 5/2011 | Hum ................... H05B 33/0815 315/307 |
| 9,144,121 B2 | 9/2015 | Frias, Sr. |
| 9,441,795 B2 | 9/2016 | Segers et al. |
| 2013/0127350 A1 | 5/2013 | Frias, Sr. |
| 2015/0260384 A1 * | 9/2015 | Purdy ................ H05B 33/0845 362/221 |
| 2017/0027028 A1 | 1/2017 | Segers et al. |

FOREIGN PATENT DOCUMENTS

| DE | 202017107488 U1 | 1/2018 |
| EP | 3096590 A2 | 11/2016 |
| EP | 3240367 A1 | 11/2017 |

* cited by examiner

Primary Examiner — Jimmy T Vu (57) ABSTRACT

A retrofit lamp is for use with a fluorescence lighting ballast. The retrofit lamp comprises a filament emulation circuit. A detection circuit detects (at least) if a connected ballast is an instant start electronic ballast or an electromagnetic ballast by detecting a potentially existing heating voltage across the filament emulation circuit. In response, an LED arrangement may be connected in a series configuration (for an instant start electronic ballast) or in a parallel configuration (for an electromagnetic ballast). In this way, the output power is managed to ensure efficient operation. A different pin safety function may also be provided in the different configurations.

15 Claims, 5 Drawing Sheets

RETROFIT LED LAMP

FIELD OF THE INVENTION

The invention relates to retrofit LED lamps, such as tubular LEDs (TLEDs), suitable for connection to a fluorescent ballast.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaires equipped with electromagnetic or electronic ballasts for fluorescent tube lamps.

There are now tubular LED ("TLED") lamps which can be used as a direct replacement for traditional fluorescent light tubes. In this way, the advantages of solid state lighting can be obtained without the expense of changing existing light fittings including the existing fluorescent lighting ballast. Indeed, TLEDs that are compatible with fluorescent lamp ballasts are the most straightforward and lowest cost way of replacing fluorescent lighting by LED lighting. Both rewiring (removing the ballast, connecting a TLED directly to AC mains) and replacing the whole luminaire are considerably more cumbersome and expensive. Both electromagnetic (EM) and electronic high frequency (HF) ballasts are used in fluorescent lighting. EM ballast output an AC signal with a frequency at substantially the mains' frequency of 50/60 Hz, and HF ballasts output an AC signal with a frequency of 10 KHz and above. The electronic high frequency ballast further comprises a program start type and a rapid start type with filament heating/detection function, and an instant start type that does not have such functions.

Different tubular LED designs are normally required for connection to EM and HF ballasts.

A problem can arise that a customer does not know what type of ballast is installed within a lighting fixture, so it would be desirable to be able to provide a TLED with compatibility with many different types of ballast.

Figure 1:
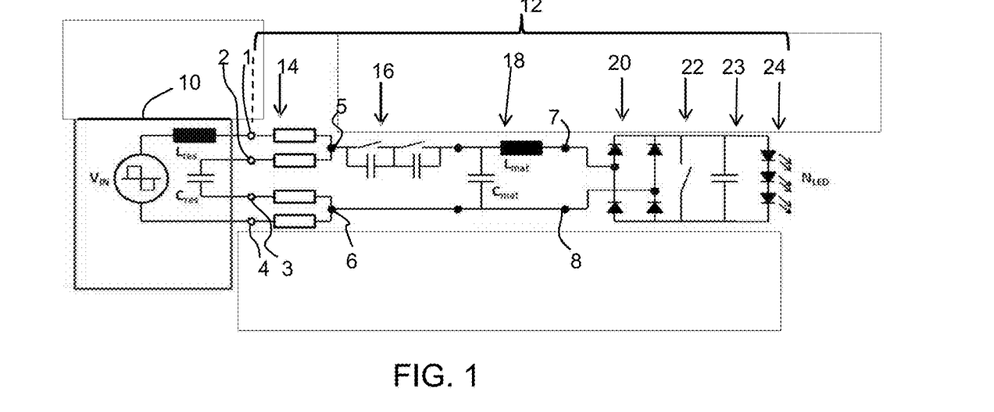
FIG. 1 shows a known TLED design for an electronic ballast.

For completeness, FIG. 1 shows a typical block diagram of a TLED that is compatible with an electronic (high frequency) fluorescent ballast.

The ballast 10 comprises a half-bridge parallel resonant converter and it drives an electronic (high frequency) ballast compatible TLED 12.

The ballast 10 and high frequency compatible TLED 12 are connected via the connection pins 1 and 2 at one end of the TLED and via the connection pins 3 and 4 at the other end of the TLED (shown on one side of the circuit diagram for simplicity).

A high frequency compatible TLED 12 typically comprises some or all of the building blocks depicted in FIG. 1. These are a filament emulation unit 14, a reconfigurable capacitance circuit 16 for standby function, an impedance matching circuit 18, a rectifier 20, an LED driver 22, a smoothing capacitor 23 and the LED string 24.

For most of these building blocks, the implementations shown in FIG. 1 are just examples and other implementations of their functions are possible and are also used. The LED driver shown in FIG. 1 is a shunt switch driver.

The details of the design of the half-bridge ballast 10 are not shown in FIG. 1. This type of ballast is also just an example and other implementations such as push-pull converters are also possible and in use.

The TLED 12 comprises four connection pins that are used to connect it to the ballast 10. Pin 1 and pin 2 are located at one end of the TLED and pin 3 and pin 4 are located at the other end of the TLED. The filament emulation unit comprises first circuitry connecting pin 1 and pin 2 to a pin 5 and pin 3 and pin 4 to a pin 6. Pin safety and start-up circuit 16, matching circuit 18, and rectifier 20 are connected to the ballast only via pin 5 and pin 6.

There are different types of starting technology used within electronic (high frequency) fluorescent ballasts, which give rise to different ballast outputs, and hence different inputs to the connected lamp.

Program and rapid start ballasts rely on a low voltage preheating method so that, when the light switch is turned on, the ballast heats/detects the filament of the lamp then turns on it. Accordingly, the program and rapid start ballasts have a lamp filament heating/detection circuit. The specific heating circuit or detection circuit may be different for a program start ballast and a rapid start ballast, and have different operation durations: less than 500 ms for a rapid start type and more than is for a program start type. Electromagnetic ballasts also have this preheating function similar to the electronic ballasts, and it also comprises a lamp filament heating circuit (whose specific implementation may be different from that of the program start ballast or rapid start ballast). In general, the filament heating/detection circuits in those different types of ballast are called as lamp filament interfacing circuit in this patent application.

Instant start ballasts do not use a preheating method. Instead, they apply a high voltage across the lamp upon initial turning on. Instant start ballasts are used when fluorescent lamps are not switched on and off frequently. Instant start ballasts consume less energy than any other type of lamp ballast.

Program start ballasts are typically paired with occupancy or motion sensors. In this way, the ballast maximizes the number of lamp starting cycles while maintaining energy efficiency. The program start ballast triggers a specific sequence of events to ultimately power on the light. The program for example comprises application of a low voltage across the lamp before supplying voltage to pre-heat the cathodes during a preheat interval. The voltage across the lamp is kept low during the preheat interval to reduce the amount of glow current. A higher voltage is then applied to establish an arc.

These different types of electronic ballast complicate further the compatibility issues.

Figure 2:
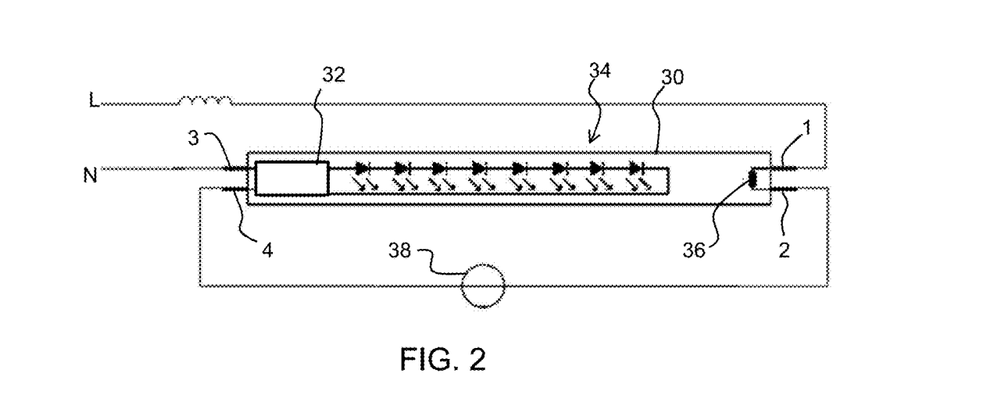
FIG. 2 shows a known TLED design for an electromagnetic ballast.

FIG. 2 shows a typical block diagram of a TLED 30 that is compatible with an EM fluorescent ballast. The TLED 30 comprises a driver 32 which connects to the LED arrangement 34, which is in the form of an LED string.

The LED driver 32 comprises a rectifier, EMI filter, and a driver circuit (e.g., a switch mode power supply circuit, for example a Buck circuit).

The connection pins of the lamp (and the corresponding terminals of the end connectors of the luminaire housing) define a live terminal 1 at one end and a neutral terminal 3 at the other end. EM ballast compatible LED tubes are often designed for single-ended input as shown in FIG. 2, namely a driver being powered by the pins at one end only. A dummy starter 38 (which is typically a fused short) is used to close the current loop between the two ends.

This connection scheme provides protection against pin leakage currents and thus provides pin safety because there is no conductive path from one end of the lamp itself to the other. Therefore, no leakage current can flow if somebody touches the pins at one end while the other end is already energized. The input power is applied to one end of the tube and the other end is provided with a fuse 36 for passing through the current to complete a circuit between external live L and neutral N connections. The glow starter in the fixture is then replaced with the dummy starter 38. The lamp can be installed with either orientation.

However there are also double-ended input LED tubes whose pin safety is an issue generally for connection to electronic ballasts. Various pin safety measures have been proposed. These pin safety measures usually interrupt the electrical connection between both ends of the TLED by at least one switch that is only closed when both ends of the TLED are inserted into the luminaire. However, both electrical and mechanical pin safety mechanisms are known. In mechanical pin safety solutions, at each end of the TLED a switch is closed when pressing a button. Either the lamp holder will push the button when inserting the TLED into the luminaire or it needs to be pressed manually.

There is therefore a need to enable compatibility of a retrofit lamp to different ballast types, and also to ensure pin safety.

U.S. Pat. No. 9,441,795 discloses a retrofit LED lamp which comprises a circuit to detect whether the ballast is an EM ballast or a HF electronic ballast based on frequency or measured current (paragraph [0014]), and to connect LED groups in parallel when connected to a HF ballast (or low current), and in series when connected to an EM ballast (or high current). It is based on adapting the total forward voltage of the LED arrangement to the type of ballast which is present. For a higher voltage EM ballast, more LEDs are in series, therefore with a higher string voltage. The detection of which ballast type is present is for example based on detecting a frequency, output impedance, or rate of change of voltage or current at the output of the ballast.

U.S. Pat. No. 9,144,121 (and US 2013/0127350) discloses a reconfigurable LED array which uses LED pairs which may be connected in series or parallel. The configuration changes the voltage rating of the LED array and its function is to match the mains voltage and providing constant current for different mains voltage. US20170027028A1 also discloses a switching of circuit configuration according to a frequency of the output of the ballast, or a frequency related parameter in current or voltage of the ballast.

A problem with lamps designed for multiple types of ballast is that they have poor energy performance. In particular, in U.S. Pat. No. 9,441,795, the output from different ballasts (current and voltage) differ such that different ballast types will give different efficiency.

SUMMARY OF THE INVENTION

The invention is defined by the claims.

In context of the invention, a goal is to provide a lamp with compatibility and unified power for different ballasts, especially the ballasts with different output currents. For example, an embodiment of the invention aims to be compatible with instant start electronic ballast for T8 size fluorescent lamps, and EM ballast as well as program start and rapid start electronic ballast for T12 size fluorescent lamps. The inventor has found that the output current of an instant start electronic ballast for T8 is lower than that of an EM/program start or rapid start ballast for T12. It is thus a concept of the invention to reconfigure LEDs of a lamp according to the type of fluorescent ballast to which the lamp is connected. In particular, the configuration is altered in dependence on the current provided by the ballast, so that the power is more consistent (similar) as between different ballast types, and thereby efficiency improvements are obtained especially for ballasts with large output current. More specifically, in the case of an EM ballast, rapid start and program start electronic ballast, with large ballast current, the LEDs are configured in parallel; and in the case of an instant start ballast with small ballast current, the LEDs are configured in series, such that the total power (equivalently voltage multiplied by current) of the lamp is consistent i.e. more similar.

U.S. Pat. No. 9,441,795 discloses an opposite approach: when the measured current is large indicating an EM ballast, the LEDs are connected in series; otherwise the LEDs are connected in parallel for small measured current indicating a HF ballast. A technical problem of this is that the lamp has quite different output power for different types of ballasts.

A major difference from US 2013/0127350 is that US 2013/0127350 is for providing a constant current by reconfiguration of the LEDs given different amplitude of a voltage source. The current is determined by the parallel or series configuration of the LEDs. Also in this prior art, the power is not constant since the forward voltage of LEDs is not constant but the current is maintained constant. On the contrary, this invention is particularly suitable for a ballast which has a rated current source: the reconfiguration cannot change the current of the ballast (the current is dependent on the ballast's rating), or the reconfiguration can not match an input voltage of the ballast (the ballast is not a voltage source). The reconfiguration of the invention is for matching different ballast currents, thereby providing a similar power universal for different types of ballasts. A similar power can be provided by varying the LED voltage, to avoid that the series LED segments would consume too much power if the current to the series configuration is high. The reconfiguration of the invention is thus different to US 2013/0127350.

According to examples in accordance with an aspect of the invention, there is provided a retrofit lamp to be used with a lighting ballast, comprising:

a first pair of connection pins and a second pair of connection pins, a filament emulation circuit between the connection pins of the first pair and/or between the connection pins of the second pair, a detection circuit comprising a voltage detection element to react to a potentially existing heating voltage across the filament emulation circuit;

an LED arrangement comprising at least two LED segments; and a reconfiguration circuit adapted to connect the at least two LED segments in a series configuration if the heating voltage is not existing and to connect the at least two LED segments in a parallel configuration if the heating voltage is existing.

In an embodiment, the detection circuit is adapted to react to the potentially existing heating voltage in order to detect if the connected lighting ballast is a first type of ballast without a lamp interfacing circuit and or a second type of ballast with a lamp interfacing circuit, wherein said lamp interfacing circuit comprises a lamp filament heating circuit adapted to output the heating voltage. The first type of ballast is rated to output a first current and the second type of ballast is rated to output a second current higher than the first current.

More specifically, an instant start electronic ballast, for example for a T8 size fluorescent tube lamp, for example delivers approximately half the output current of an electromagnetic ballast for the T12 size fluorescent tube lamp and the program start/rapid start electronic ballast for T12 size fluorescent tube lamp. By using a parallel configuration for the higher current electromagnetic ballast, or program start electronic ballast or rapid start electronic ballast, the current is split between two branches, each with a lower string voltage. Thus, the total power is reduced and matches the power when the same lamp is driven by an instant start electronic ballast wherein the LED segments are series re-configured for the instant start electronic ballast. Those ballasts with different output currents can be differentiated by whether the ballast outputs a heating voltage to the filament of the lamp. Thus the embodiment of the invention proposes to re-configure the LED segment according to the existing of the heating voltage or not. In this way, the LED configuration is set to match the current delivery to the lamp, without using complex detection technology such as frequency detection to differentiate the ballasts. In particular, this design gives better energy saving performance for a lamp which can be driven by both electronic and electromagnetic ballasts. Here the term "rated" in the claims means the ballast operating as a current source to output this current, substantially regardless of the impedance of the load.

The series configuration for example comprises a series capacitance which is adapted to be bypassed in the conduction paths of the parallel configuration.

The series configuration thus comprises a series capacitance which is not present in conduction paths of the parallel configuration. At high frequencies the capacitors have low impedance and at low frequencies they have a high impedance. They perform a pin safety function by blocking the dangerous low frequency current components if the lamp is to be connected to an EM ballast, and they also and act as current limiters for the high frequency signal of an HF ballast thus a pin safety function is also provided if the lamp is connected to a HF ballast. By providing the capacitors only in the series configuration, they can be optimized taking into account the high frequency signal received from the ballast.

Preferably, said lighting ballast comprises a fluorescent lighting ballast, wherein said first type of ballast is without a lamp filament interfacing circuit and said second type of ballast is with a lamp filament interfacing circuit.

This embodiment provides a retrofit lamp for fluorescent lamps. Traditional fluorescent lamps are used with different types of ballasts with or without a lamp filament interfacing circuit, and this embodiment provides compatibility for both types.

The first type of ballast for example comprises an instant start electronic ballast, and the second type of ballast comprises any one of an electromagnetic ballast, a program start electronic ballast, and a rapid start electronic ballast The EM ballast, rapid start and program start electronic ballasts, with the lamp filament interfacing circuit, delivers a high current, for which the parallel configuration is desired. Otherwise the instant start electronic ballast, without the lamp filament interfacing circuit, delivers a low current for which series configuration is selected.

Thus, it can be seen that the instant start (low current) type of ballast triggers the series configuration, and the other (high current) types of ballast trigger the parallel configuration.

Preferably, the lamp filament interfacing circuit further comprises a lamp filament detection circuit adapted to detect a lamp filament impedance.

For the program start electronic ballast with an optional filament detection circuit, the lamp preferably comprises a filament emulation circuit adapted to be connected to the filament detection circuit.

Preferably, the lamp filament heating circuit in the rapid start ballast is adapted to operate within 500 ms, and the lamp filament heating circuit in the program start ballast is adapted to operate for longer than 1 s.

The lamp may comprise a first pair of connection pins and a second pair of connection pins, and comprise a filament emulation circuit between the respective pair of connection pins and connected to the detection circuit, wherein said filament emulation circuit comprises resistance and capacitance, and said detection circuit comprises a voltage detection element to detect the said first type or second type by reacting to a potentially existing heating voltage across a respective pair of connection pins, output by the lamp filament interfacing circuit.

This provides a way to detect a lamp filament interfacing circuit in the ballast and thereby to detect the first type or the second type.

The lamp may comprise a first diode bridge rectifier adapted to be used for the series configuration, wherein the series configuration of the at least two LED segments is between a positive output and a negative output of the first diode bridge rectifier, and a second diode bridge rectifier adapted to be used for the parallel configuration, wherein the parallel configuration is between a positive and a negative output of the second bridge rectifier.

The use of separate diode bridge rectifiers enables different current flow paths for the two configurations.

For example, there may be a first crossover diode from the positive output of the second diode bridge rectifier to an anode of a first LED segment of the at least two LED segments, a second crossover diode from a cathode of a second segment of the at least two LED segments to the negative output of the second diode bridge rectifier, a third crossover diode from the positive output of the second diode bridge rectifier to an anode of the second LED segment of the at least two LED segments, and a fourth crossover diode from a cathode of the first LED segment of the at least two LED segments to the negative output of the second diode bridge rectifier.

Note that when a diode is described as being position from A to B, it indicates that the forward direction of the diode is from A to B (i.e. the anode is at A and the cathode is at B).

These crossover diodes provide conduction paths between the second diode bridge rectifier and the LED segments (for both opposite polarities of signals) in a parallel connection. The series configuration preferably further comprises a diode forwarded from the cathode of the first LED segment to the anode of the second LED segment. This diode is used to allow the series connection and prevent a conduction path from the third to fourth crossover diode.

The detection circuit for example comprises a first detection unit between the first pair of pins and a second detection unit between the second pair of pins. These units are used to detect the type of ballast from the signal received from the ballast.

The first and second detection units for example each comprise a gated switch comprising power terminals and a control terminal, wherein said gated switch is adapted to connect the second diode bridge rectifier if a voltage between the pair of pins exceeds a threshold. This embodiment achieves both function of detection and reconfiguration by the same gated switch component, and saves component number and cost.

The gated switch for example comprises a TRIAC and the detection unit further comprises a filter circuit comprising a capacitor and resistor in parallel between the respective pair of connection pins. Other gated switches such as silicon controlled rectifiers or transistor circuits may be used.

The TRIAC for example responds to a gate current. A voltage across the pins can be thus be converted to a current. The filter circuit avoid erroneous triggering of the TRIAC by providing a path for noise current (smoothing the noise current) which then does not enter the gate of the TRIAC.

The gated switch optionally further comprises a shunting circuit for shunting a portion of current between the pair from the control terminal of the gated switch. This is useful since some ballasts will inject higher current into the pins which may damage the TRIAC if the high current is not shunted.

Each gated switch is for example between one connection pin of a respective pair of connection pins and an input to the second diode bridge rectifier via the power terminals, and the control terminal is connected to the other connection pin of a corresponding pair of connection pins. It thus allows or prevents current flow to (or from) the second diode bridge rectifier, and thus either enables or disables the parallel configuration. Disabling the parallel configuration provides pin safety function. When in the parallel configuration is enabled, the diodes in the circuit automatically implement the parallel configuration instead of the series configuration. Thus, the parallel configuration has lower impedance and in turn effectively disables the series configuration which not only has high impedance of series LED but also has the extra capacitance.

As mentioned above, a capacitor may be used for pin safety, together with the gated switch. In particular, the lamp may be a tubular LED lamp adapted to retrofit a T8 or T12 size fluorescent tubular lamp, wherein the first ballast type is adapted for a T8 size fluorescent tubular lamp, and said second ballast type is adapted for T12 size fluorescent tubular lamp. The series configuration comprises a first series capacitor (C2) at one input end and a second series capacitor (C3) at another input end.

These capacitors are thus at the connection pins for providing pin safety. The first and second series capacitors for example each have a capacitance in the range 0.5 nF to 10 nF.

Preferably, a forward voltage of the parallel configuration is substantially half of the forward voltage of the series configuration. This provides a consistent/similar output power of the retrofit lamp for different types of ballasts.

Instead of used with fluorescent lighting ballast, the retrofit lamp is for example a HID replacement LED lamp, and said lighting ballast comprises a HID lighting ballast.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a retrofit lamp to be used with a fluorescence lighting ballast. A detection circuit detects (at least) if a connected ballast is a ballast with low output current or a ballast with high output current. In response, an LED arrangement may be connected in a series configuration for a low output current ballast or in a parallel configuration for a high output current ballast. In this way, the output power is maintained and managed to ensure efficient operation especially for high output current ballasts. Different pin safety functions are also provided in the different configurations.

Figure 3:
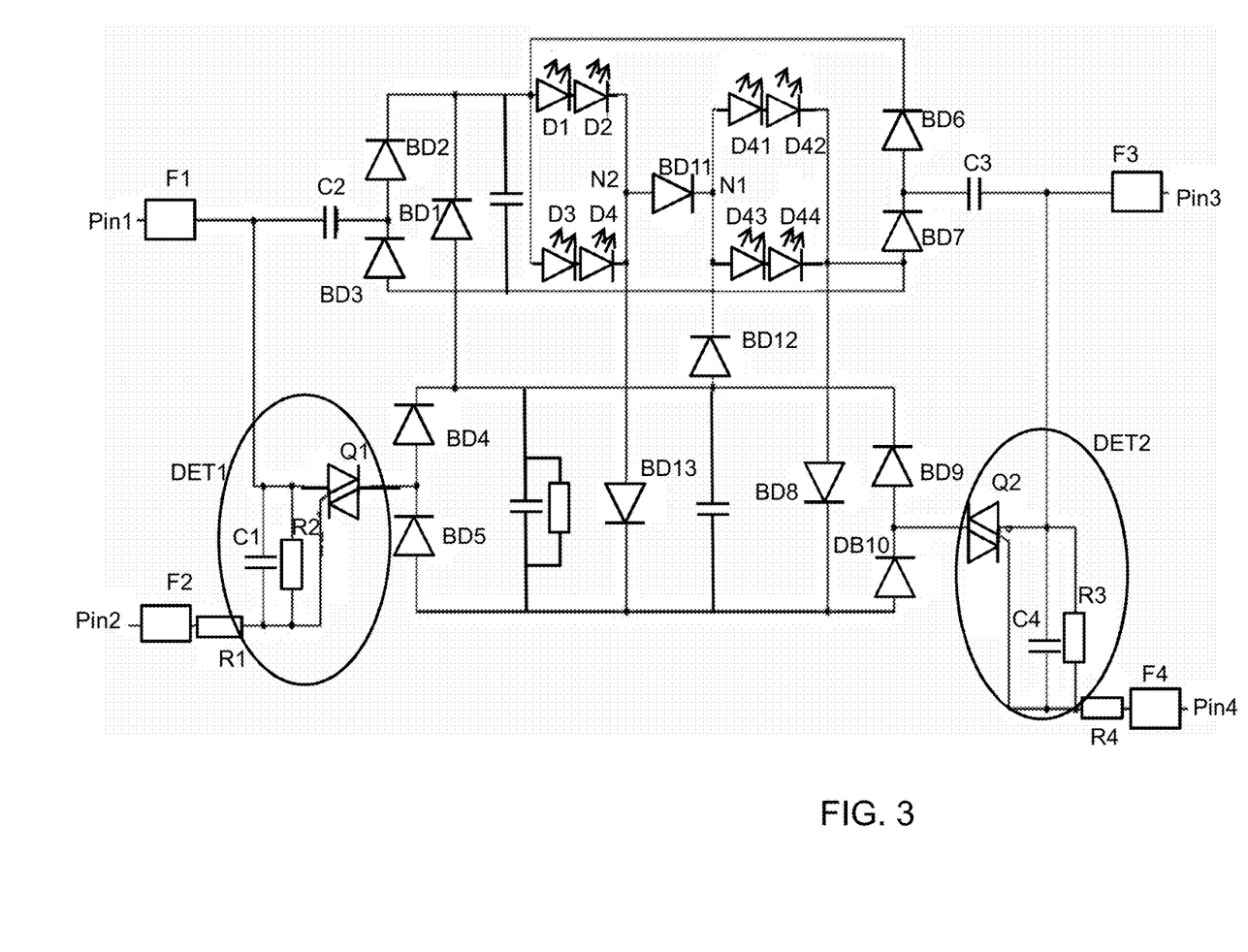
FIG. 3 shows an example of TLED design in accordance with the invention.

FIG. 3 shows a lamp in accordance with an example of the invention.

The lamp comprises four input pins in two pairs, as is conventional for a tubular lamp. The first pair comprises pins Pin1 and Pin 2 and the second pair comprises pins Pin3 and Pin4. The each connect to a respective fuser, F1 to F4.

The four pins connect to a ballast, which may be an electronic high frequency ballast (with rapid start, instant start or program start) or it may be an electromagnetic ballast.

The lamp comprises an LED arrangement D1-D4, D41-D44 comprising at least two LED segments. LEDs D1-D4 form a first segment (of two parallel branches each with two LEDs) and LEDs D41-D44 form a second segment (again of two parallel branches each with two LEDs). Of course, each segment may comprise any number of LEDs.

The drive voltage from the ballast for driving the LED arrangement is present across the first pair and the second pair. Note that the lamp can applied with either end-to-end orientation and with either of the two possible 180 degree rotational positions. For an instant start ballast, the lamp holder is shunted, so the two pins at each end are short circuited. For program start and rapid start EM ballasts, all four pins are connected.

Pin 1 connects to a first input of a first diode bridge rectifier formed of bridge diodes BD2, BD3, BD6 and BD7.

Pin3 connects to a second input of that first diode bridge rectifier. The connection from Pin1 and Pin3 to the first and second inputs (respectively) of the first diode bridge rectifier is not direct, but instead is through respective series capacitors C2 and C3.

Pin 1 also connects to a first input of a second diode bridge rectifier formed of bridge diodes BD4, BD5, BD9 and BD10. Pin3 connects to a second input of that second diode bridge rectifier. However, the connections to the second diode bridge rectifier are through gated switching devices Q1, Q2. Thus, the connections are also not direct but can be controlled.

A detection circuit DET1, DET2 is used at least to detect if a connected ballast is a high output current electronic ballast, including EM, program start or rapid start ballast, or an low output current ballast including instant start ballast.

The two LED segments are connected in a series configuration if the ballast is a low output current ballast like the instant start electronic ballast and they are connected in a parallel configuration if the ballast is a high output current ballast like an electromagnetic ballast. The first diode bridge rectifier is used for the series configuration and the second diode bridge rectifier is used for the parallel configuration. The series configuration comprises the two series capacitors, and they are not present in the conduction paths of the parallel configuration.

The configuration is controlled by some active components and some passive components. The active components comprise the two gated switching devices Q1, Q2, which in this example are shown as TRIACs. When they are closed, the pin connections to the second diode bridge rectifier are made. This establishes the parallel connection of the LED segments. As will be clear from the discussion below, this automatically disables the series configuration due to lower impedance.

The passive components comprise diodes BD1, BD8, BD12, BD13 which together may be considered to comprise a reconfiguration circuit. Note that these diodes and those of the two diode bridge rectifiers may all be considered to be part of a global diode bridge circuit (hence they are named BD# for bridge diode, whereas the LEDs are named D#). The diodes BD1, BD8, BD12, BD13 provide crossing paths between the two diode bridge rectifiers, and they may thus be considered to be comprise crossover diodes.

There is a first crossover diode BD1 from a positive output of the second diode bridge rectifier to a positive output of the first diode bridge rectifier, a second crossover diode BD8 from a negative output of the first diode bridge rectifier to a negative output of the second diode bridge rectifier, a third crossover diode BD12 from the positive output of the second diode bridge rectifier to a first node N1 between the at least two LED segments, and a fourth crossover diode BD13 from a second node N2 between the at least two LED segments to the negative output of the second diode bridge rectifier.

These crossover diodes provide conduction paths from the second diode bridge rectifier up to the LED segments and back down in a parallel manner. A diode BD11 is in series between the at least two LED segments, connected between the second and first nodes N2, N1. This prevents a connection between diodes BD12 and BD13 which short circuits the output of the second diode bridge rectifier.

The detection circuit comprises a first detection unit DET1 between the first pair of pins Pin1, Pin2 and a second detection unit DET2 between the second pair of pins Pin3, Pin4. The first and second detection units each comprise a filter circuit and the respective gated switch Q1, Q2. The first detection unit DET1 has a capacitor C1 in parallel with a resistor R2 and the second detection unit DET2 has a capacitor C4 in parallel with a resistor R3.

In this embodiment, the detection circuit is for detecting the presence of the lamp filament interfacing circuit of the ballast, in order to detect the type of the ballast, since the presence of the lamp filament interfacing circuit or not presence is strongly related to whether it is a high output current ballast or a low output current ballast. The detection circuits implement a voltage detection function, and switch off the TRIAC when a pin voltage of the EM ballast/program start/rapid start ballast is not detected, and switching on the TRIAC when such a pin voltage is detected. For EM ballast and program start/rapid start ballasts in north America, this pin voltage is for example 3.6V. A filter circuit comprising C1 and R2 is for smoothing the pin voltage to avoid incorrect detection.

The TRIAC is a current driven component. When a small positive or negative current passes through the gate pin, the TRIAC will be conduct as a short. With an instant start ballast, the two pins at each end are shorted, so that there is no current through the gate of the TRIAC. The TRIAC is open.

Figure 6:
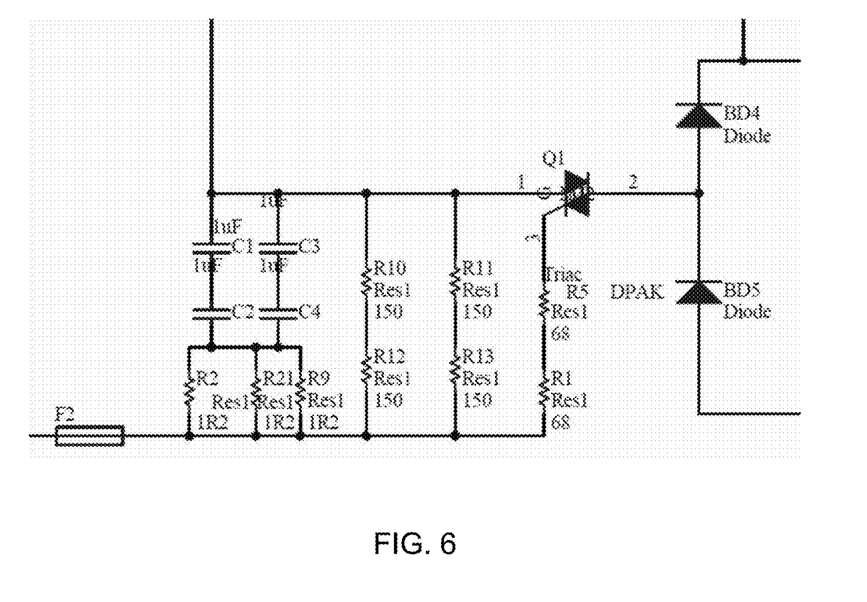
FIG. 6 shows an alternative embodiment for the detection circuit and the switch Q1.

EM ballasts in North America are mostly rapid start ballasts, with a filament voltage of 3.6V. With this filament voltage at the two pins of each end, a small current goes through the gate and the TRIAC conducts. A program start ballast also has a filament voltage and so that the TRIAC will also conduct. Some of the program start ballasts have higher filament current which may lead to too high gate current for the TRIAC. For this purpose, additional RC components or different values may be chosen to make most of the filament pass through the RC circuit and reduce the current through the TRIAC gate. FIG. 6 shows this embodiment.

Thus the common feature between program start, rapid start and EM ballasts is the lamp filament heating circuit. EM ballasts may not have a filament detection circuit while the program start and rapid start ballast may have filament detection. These are termed "filament interfacing circuits". The instant start ballast has no filament interfacing circuit.

As mentioned above, the most basic function is to detect that the ballast is an instant start electronic ballast or an electromagnetic ballast.

There is significant difference between the output current for an instant start electronic ballast and an electromagnetic/program start/rapid start ballast. For example, for T8 instant start electronic ballast, the output current is almost as low as half the current for a T12 electromagnetic/program start/rapid start ballast. This means that for a single lamp design, it is a problem to output the appropriate lamp power. The lamp current could be around 200 mA when connected to an instant start electronic high frequency ballast and around 430 mA when connected to a low frequency electromagnetic ballast or program start/rapid start high frequency ballast, due to the differences between the ballast. For the same LED layout, the power for the T12 electromagnetic/program start/rapid start ballast will be double that for the T8 instant start electronic ballast.

The series and parallel configuration resolves this issue. By using a parallel configuration for the higher current ballast, the current is split between two branches, and each branch operates a string voltage corresponding to the LED segment (i.e. half the string voltage of the series connection). Thus, the total power is reduced. In this way, the LED configuration is set to match the current delivery to the lamp. In particular, this design gives better energy saving performance for a lamp which can be driven by both high and low output current ballasts. Also, the parallel configuration is not active due to the open of the TRIAC thus it would not conduct leakage current if the lamp is not properly connected to the ballast; the series configuration is conductive but the series capacitor blocks low frequency current from EM ballast and limits high frequency current from HF ballast such that is current is not harmful for human touch. Thus the detection circuit and reconfiguration circuit provides both pin safety and output power regulation. This is a significant technical advantage.

As explained above the detection circuit DET1, DET2 can detect if a connected ballast is a rapid start or program start electronic ballast or an EM ballast. In this case, the two LED segments are connected in parallel, as this is a high current operating mode.

Figure 4:
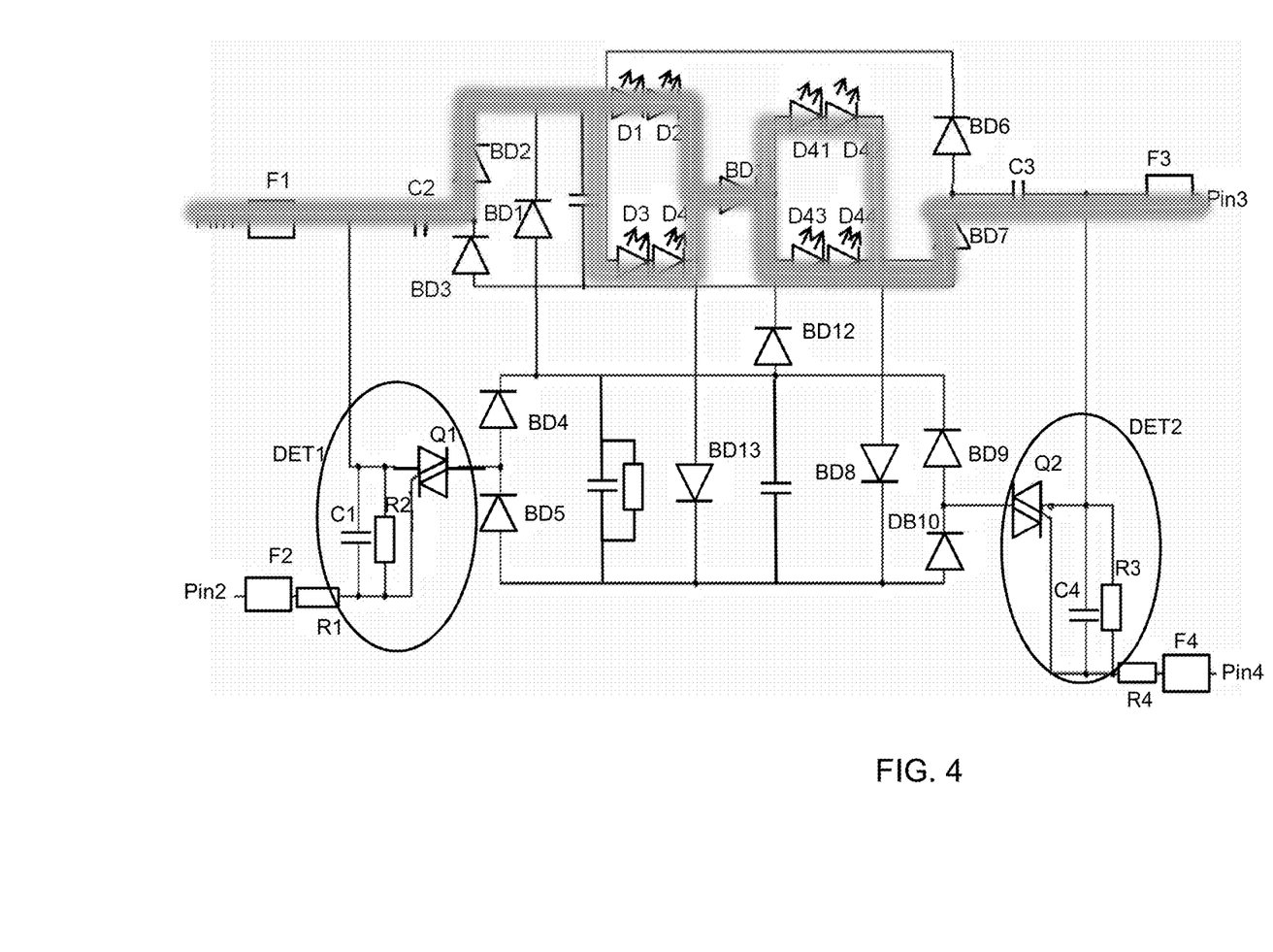
FIG. 4 shows one conduction path through the TLED design of FIG. 3.
Figure 5:
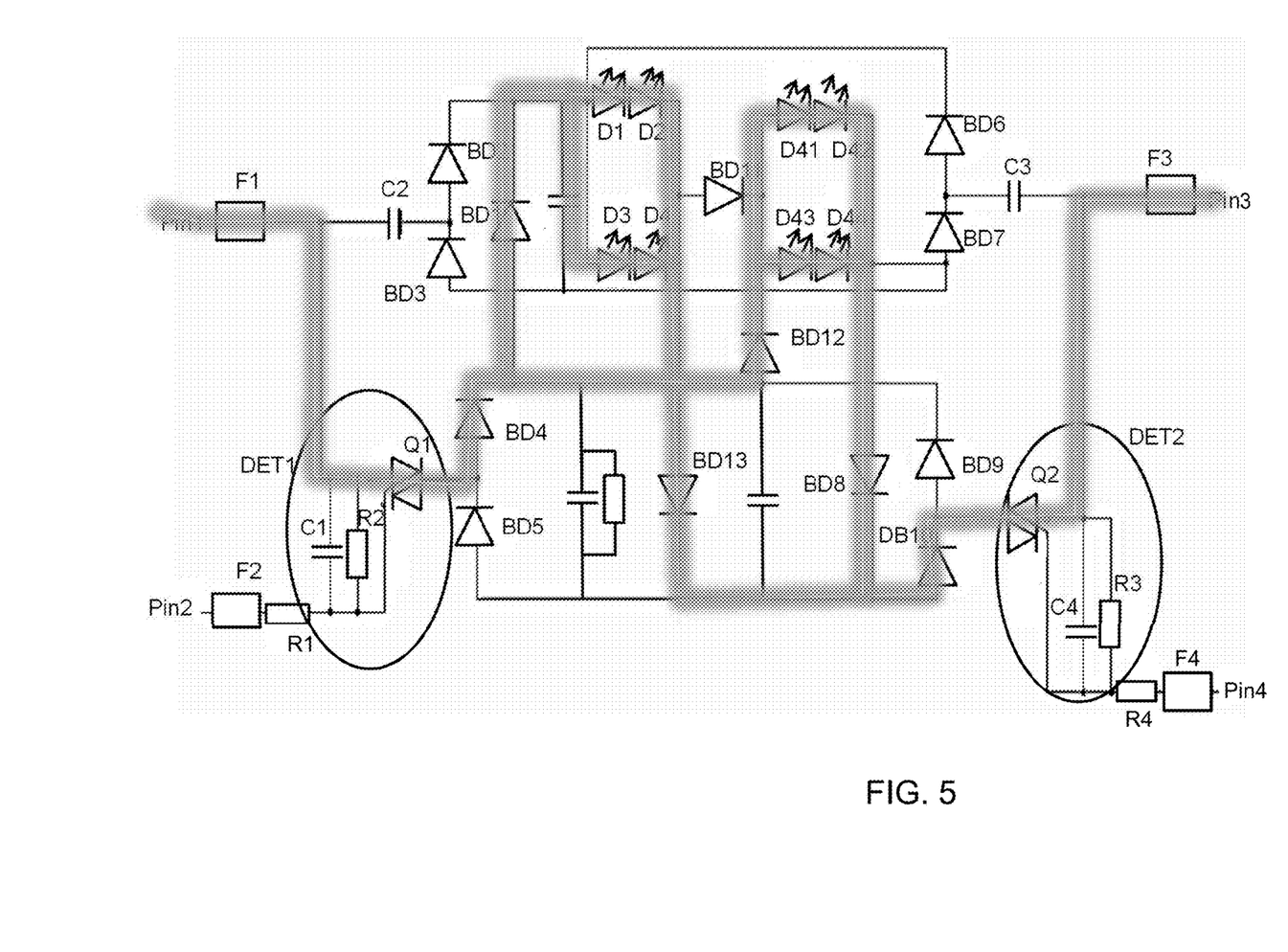
FIG. 5 shows another conduction path through the TLED design of FIG. 3.

FIG. 4 shows the conduction paths for the series configuration and FIG. 5 shows the conduction paths for the parallel configurations. They both assume Pin1 is at a higher voltage than Pin3 so that current flows from Pin1 to Pin3. However, there is an equivalent conduction path in the opposite current flow direction, in the opposite phase of the AC output current of the ballast (either EM or HF). As will be apparent to those skilled in the art, one sub-set of diode bridge rectifier diodes is used for one conduction direction and a remaining other sub-set is used for an opposite conduction direction.

For the series configuration of FIG. 4, it is assumed that the lamp is connected to an instant start ballast, there is no pin voltage across Pin1 and Pin2, or across Pin3 and Pin3, the TRIACs Q1, Q2 are turned off. The conduction path is through the input side diode BD2 of the first diode bridge rectifier, through the first LED segment D1 to D4, through the series diode BD11, through the second LED segment D41 to D44, through the output side diode BD7 of the first diode bridge rectifier to Pin3. The current path is also through the capacitors C2, C3.

The second diode bridge rectifier is isolated by the two TRIACs so no currents flow through the crossover diodes.

For the parallel configuration of FIG. 5, it is assumed that the lamp is connected to a program start/rapid start ballast or an EM ballast, so there is a pin voltage across Pin1 and Pin2, and across Pin3 and Pin4, the TRIACs Q1, Q2 are turned on.

A first conduction path is through the first TRIAC Q1, through the input side diode BD4 of the second diode bridge rectifier, through the crossover diode BD1, through the first LED segment D1 to D4, through the crossover diode BD13, through the output side diode BD10 of the second diode bridge rectifier, and through the TRIAC Q2 to Pin3. This is a first parallel branch.

A second conduction path is through the first TRIAC Q1, through the input side diode BD4 of the second diode bridge rectifier, through the crossover diode BD12, through the second LED segment D41 to D44, through the crossover diode BD8, through the output side diode BD10 of the second diode bridge rectifier, and through the TRIAC Q2 to Pin3. This is a second parallel branch. The crossover diodes provide a more direct conduction path that the (other) LED segment so that the series configuration is inhibited.

The detection circuits function as filament emulation circuits. They comprise RC network circuits to emulate the filament for program start ballasts. They trigger the TRIACs to set the parallel mode when connected to a program start (or rapid start) ballast. The detection circuits may thus have more a complex RC network than the simple parallel arrangement shown in order to provide the required detection and filament emulation.

As explained above, the series capacitors C2, C3 provide a current limiting function as well as a pin safety function. The first and second series capacitors may each have a capacitance in the range 0.5 nF to 10 nF.

In the series configuration, the capacitors provide a current blocking function to low frequency components (as they have a high impedance to low frequencies), which are those harmful to the body, and they limit the high frequency current from electronic ballasts. They are not in circuit for the low frequency (electromagnetic) ballast, so do not hinder operation of the low frequency operation of the circuit.

When operating with a low frequency electromagnetic ballast, the TRIACs implement the pin safety by blocking abnormal current conditions. When the pin voltage is not detected, meaning the lamp is not properly connected to an EM ballast or a program start ballast or a rapid start ballast, the TRIAC is open and the parallel configuration is inactive. The remaining series configuration has the series capacitor to block the low frequency current from the EM ballast, limit the high frequency current from program start/rapid start ballast or instant start ballast from a human-hazardous level. Thus there is no hazardous current regardless of the type of ballast to which the lamp is (incorrectly) connected.

In the above embodiment, the detection circuit is implemented by a voltage detection circuit to detect the filament interfacing circuit in the ballast which directly corelates to its output current. This is only an example. The detection circuit can use other ways to determine the ballast is low current type or high current type. For example, the detection may have a current sensing element to sense the output current of the ballast directly.

Note the above embodiments are based on lighting ballasts for fluorescent lamps. The invention is also applicable for providing a HID retrofit LED lamp universal for different lighting ballasts for HID lamps.

It is noted that there are some additional capacitors and resistors shown in FIG. 3, for circuit optimization, such as voltage filtering.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A retrofit lamp to be used with a lighting ballast, comprising:
   a first pair of connection pins (Pin1, Pin2) and a second pair of connection pins (Pin3, Pin4),
   a filament emulation circuit between the connection pins of the first pair and/or between the connection pins of the second pair,
   a detection circuit (DET1, DET2) comprising a voltage detection element to react to a potentially existing heating voltage across the filament emulation circuit;

an LED arrangement (D1-D4, D41-D44) comprising at least two LED segments (D1-D4; D41-D44); and a reconfiguration circuit (BD1, BD8, BD12, BD13) adapted to connect the at least two LED segments in a series configuration if the heating voltage is not existing and to connect the at least two LED segments in a parallel configuration if the heating voltage is existing.

2. A retrofit lamp as claimed in claim 1, wherein the series configuration comprises a series capacitance which is adapted to be bypassed in the conduction paths of the parallel configuration, and said lighting ballast comprises a fluorescent lighting ballast.

3. A retrofit lamp as claimed in claim 2, wherein the detection circuit is adapted to react to the potentially existing heating voltage in order to detect if the connected lighting ballast is a first type of ballast without a lamp interfacing circuit and or a second type of ballast with a lamp interfacing circuit, wherein said lamp interfacing circuit comprises a lamp filament heating circuit adapted to output the heating voltage, the first type of ballast comprises: an instant start electronic ballast, and the second type of ballast comprises any one of:
an electromagnetic ballast;
a program start electronic ballast; and
a rapid start electronic ballast.

4. A retrofit lamp as claimed in claim 3, wherein the first type of ballast is rated to output a first current and the second type of ballast is rated to output a second current higher than the first current, said lamp filament interfacing circuit further comprises a lamp filament detection circuit adapted to detect a lamp filament impedance, wherein the lamp filament heating circuit in the rapid start ballast is adapted to operate within 500 ms, and the lamp filament heating circuit in the program start ballast is adapted to operate for longer than 1 s.

5. A retrofit lamp as claimed in claim 1, wherein said filament emulation circuit comprises at least one of a resistance (R2) and a capacitance (C1).

6. A retrofit lamp as claimed in claim 1, comprising:
a first diode bridge rectifier (BD2, BD3, BD6, BD7) adapted to be used for the series configuration, wherein the series configuration of the at least two LED segments is between a positive output and a negative output of the first diode bridge rectifier (BD2, BD3, BD6, BD7); and
a second diode bridge rectifier (BD4, BD5, BD9, BD10) adapted to be used for the parallel configuration, wherein the parallel configuration is between a positive and a negative output of the second bridge rectifier (BD4, BD5, BD9, BD10).

7. A retrofit lamp as claimed in claim 6, further comprising a first crossover diode (BD1) from the positive output of the second diode bridge rectifier to an anode of a first LED segment of the at least two LED segments, a second crossover diode (BD8) from a cathode of a second segment of the at least two LED segments to the negative output of the second diode bridge rectifier, a third crossover diode (BD12) from the positive output of the second diode bridge rectifier to an anode of the second LED segment of the at least two LED segments, and a fourth crossover diode (BD13) from a cathode of the first LED segment of the at least two LED segments to the negative output of the second diode bridge rectifier.

8. A retrofit lamp as claimed in claim 7, wherein the series configuration further comprises a diode (BD11) forwarded from the cathode of the first LED segment to the anode of the second LED segment.

9. A retrofit lamp as claimed in claim 1, wherein the detection circuit comprises a first detection unit (DET1) between the first pair of pins and a second detection unit (DET2) between the second pair of pins.

10. A retrofit lamp as claimed in claim 9, wherein the first and second detection units each comprise a gated switch (Q1; Q2) comprising power terminals and a control terminal, wherein said gated switch is adapted to connect the second diode bridge rectifier if a voltage between the pairs of pins exceeds a threshold.

11. A retrofit lamp as claimed in claim 10, wherein each gated switch (Q1, Q2) comprises a TRIAC, a bipolar transistor, or a MOSFET, and the detection unit further comprises a filter circuit comprising a capacitor and resistor in parallel between the respective pair of connection pins, the gated switch optionally further comprises a shunting circuit for shunting a portion of current between the pair from the control terminal of the gated switch.

12. A retrofit lamp as claimed in claim 10, wherein each gated switch is between one connection pin (Pin1, Pin3) of a respective pair of connection pins and an input to the second diode bridge rectifier via the power terminals, and the control terminal is connected to the other connection pin (Pin2, Pin4) of a corresponding pair of connection pins.

13. A retrofit lamp as claimed in claim 3, comprising a tubular LED lamp adapted to retrofit a T8 or T12 size fluorescent tubular lamp, wherein the first ballast is adapted for T8 size fluorescent tubular lamp, and said second type of ballast is adapted for T12 size fluorescent tubular lamp, and wherein the series configuration comprises a first series capacitor (C2) at one input end and a second series capacitor (C3) at another input end.

14. A retrofit lamp as claimed in claim 13, wherein the first and second series capacitors each have a capacitance in the range 0.5 nF to 10 nF, and a forward voltage of the parallel configuration is substantially half of the forward voltage of the series configuration.

15. A retrofit lamp as claimed in claim 1, comprising a HID replacement LED lamp, and said lighting ballast comprises a HID lighting ballast.

* * * * *